(12) United States Patent
Lali et al.

(10) Patent No.: US 8,673,225 B2
(45) Date of Patent: Mar. 18, 2014

(54) CONTINUOUS COUNTERCURRENT FLUIDIZED MOVING BED (FMB) AND/OR EXPANDED MOVING BED (EMB)

(75) Inventors: Arvind Mallinath Lali, Mumbai (IN); Sandeep Bhaskar Kale, Mumbai (IN); Vinod Dinkar Pakhale, Mumbai (IN); Yogeshwar Narayanrao Thakare, Mumbai (IN)

(73) Assignee: DBT-ICT Centre for Energy Biosciences, Mumbai, IN (US)

( * ) Notice: Subject to any disclaimer, the term of this patent is extended or adjusted under 35 U.S.C. 154(b) by 0 days.

(21) Appl. No.: 13/255,890

(22) PCT Filed: Mar. 9, 2010

(86) PCT No.: PCT/IN2010/000133
§ 371 (c)(1),
(2), (4) Date: Sep. 9, 2011

(87) PCT Pub. No.: WO2010/103541
PCT Pub. Date: Sep. 16, 2010

(65) Prior Publication Data
US 2012/0094364 A1   Apr. 19, 2012

(30) Foreign Application Priority Data
Mar. 9, 2009 (IN) .......................... 505/MUM/2009

(51) Int. Cl.
*B01J 8/18* (2006.01)
*B01D 15/02* (2006.01)

(52) U.S. Cl.
USPC ........... 422/142; 422/140; 422/141; 422/145; 422/261; 210/268

(58) Field of Classification Search
USPC ........... 422/140, 141, 142, 145, 261; 210/268
See application file for complete search history.

(56) References Cited

U.S. PATENT DOCUMENTS 2,701,786 A * 2/1955 Evans et al. ............... 208/300
3,003,640 A * 10/1961 Pearce ......................... 210/189
(Continued)

FOREIGN PATENT DOCUMENTS

| CA | 2322348 A1 | 3/2002 |
| EP | 0083825 A1 | 7/1983 |

(Continued)

OTHER PUBLICATIONS

Burns, et al. Continuous affinity chromatography using a magnetically stabilized fluidized bed. Biotechnology Progress. 1995; 1:95-103.

(Continued)

*Primary Examiner* — Lessanework Seifu
(74) *Attorney, Agent, or Firm* — Wilson, Sonsini, Goodrich & Rosati (57) ABSTRACT

A composite continuous countercurrent fluidized moving bed (FMB) and/or expanded moving bed (EMB) may be used for carrying out processes of recovery, purification or reaction of single or multiple component/s of interest, by contacting liquid phase containing the component/s with a solid adsorbent in continuous countercurrent mode. The net movement of the solids is against the liquid, flowing in upward direction through stages/columns, and sedimenting solids from the one stage/column are continuously fed to the top of another stage/column placed below or alongside of previous stage/column; and also operating in fluidized/expanded bed mode, wherein its countercurrent contact with up-flowing liquid is carried out. A system described herein may include a number of stages/columns. The FMB/EMB system can be used in processes for continuous recovery, purifications or reactions of various products.

13 Claims, 6 Drawing Sheets

(56) References Cited

U.S. PATENT DOCUMENTS

| | | |
|---|---|---|
| 3,152,072 A | 10/1964 | Akira et al. |
| 3,207,577 A | 9/1965 | Noriaki |
| 3,235,488 A | 2/1966 | Levendusky |
| 3,240,556 A | 3/1966 | Bhappu |
| 3,551,118 A | 12/1970 | Cloete et al. |
| 3,879,287 A | 4/1975 | Porter |
| 4,018,677 A | 4/1977 | Himsley |
| 4,035,292 A | 7/1977 | Himsley |
| 4,279,755 A | 7/1981 | Himsley |
| 4,293,423 A * | 10/1981 | Kosaka et al. ............... 210/676 |
| 6,716,344 B1 | 4/2004 | Bassi et al. |
| 2002/0153309 A1 | 10/2002 | Irvine |
| 2004/0226890 A1 | 11/2004 | Bassi et al. |

FOREIGN PATENT DOCUMENTS

| | | |
|---|---|---|
| GB | 679905 A | 9/1952 |
| GB | 1033806 A | 6/1966 |
| GB | 1086505 A | 10/1967 |
| GB | 1422412 A | 1/1976 |
| WO | WO 2010/103541 A2 | 9/2010 |

OTHER PUBLICATIONS

Gordon, et al. Optimization and simulation of continuous affinity recycle extraction. Bioseparation. 1990; 1:9-21.

Owen, et al. A new approach to continuous counter current protein chromatography: direct purification of maleate dehydrogenase from a *Saccharomyces cerevisiae* homogenate as a model system. Biotechnol Bioeng. 1997; 53(4):427-441.

PCT/IN2010/000133 international search report dated Oct. 6, 2010.

PCT/IN2010/000133 written opinion of the international searching authority dated Sep. 9, 2011.

* cited by examiner

CONTINUOUS COUNTERCURRENT FLUIDIZED MOVING BED (FMB) AND/OR EXPANDED MOVING BED (EMB)

FIELD OF THE INVENTION

The present invention relates to the continuous countercurrent fluidized moving bed (FMB) and/or expanded moving bed (EMB), more specifically multistage continuous countercurrent fluidized moving bed and/or expanded moving bed arrangement useful for adsorptive separation and/or reactions. The present disclosure provides process of extraction of active principles using said continuous countercurrent fluidized moving bed and/or expanded moving bed.

BACKGROUND OF THE INVENTION

Prior Art

Adsorption processes have been used for a number of different applications such as to carry out separations and variety of chemical reactions. From the point of view of the contactor design for adsorption, fluidized bed and expanded bed adsorption are innovative techniques. These adsorber designs enable process engineers to discard tedious and expensive steps like filtration, clarification, and concentration steps prior to selective adsorption, as adsorbent particles are fluidized or suspended in flowing fluid, to allow particulate matter-containing solution to flow freely through the bed of adsorbent without causing clogging or blockages. In addition, these techniques also deliver a clarified stream containing purified product or a product suitable for further purification and processing. Of these two techniques an expanded bed offers advantages of low back mixing through providing stabilized fluidized bed of properly designed adsorbent particles.

However, employing fluidized bed, expanded bed or packed bed of adsorbent particles has a disadvantage that they are batch operations, and require large volumes of adsorbent particles especially for large scale operations. Further, due to a significant portion the adsorbent often remaining in saturated state or waiting to come in contact with the solutes during passage of the adsorbent zone passing through the conventional packed, fluidized or expanded bed, and due to the fact that a typical adsorptive purification cycles requires multiple steps of batch operations in sequence like equilibration, loading, washing, elution and regeneration, the overall productivity of the adsorbent expressed as kg solute/s purified per hour per liter of adsorbent becomes low especially as volume of the adsorbent bed becomes large for large scale operations.

Several attempts have been made to design continuous countercurrent adsorption contactors to circumvent above problems:

Technical paper by Ryan O. Owen, Graham E. McGreath and Howard Chase, "A new approach to continuous counter current protein chromatography: direct purification of maleate dehydrogenase from a *Saccharomyces cerevisiae* homogenate as a model system", Biotechnol. Bioengg. 53 (4), 427-441 (1997) described expanded bed for continuous chromatographic purification. The system has several problem areas and requires continuous manipulation to maintain constant bed height. Also the adsorbent extractor used for removal of adsorbent makes the design complicated and affects the stability of expanded bed.

Burns, M. A. and D. J. Graves, "Continuous Affinity Chromatography Using a Magnetically Stabilized Fluidized Bed", Biotechnology Progress 1, 95-103 (1995) suggested a two-column magnetically stabilized fluidized bed system for the continuous chromatography of biochemical products. The magnetically stabilized fluidized bed system is generally considered to be complicated and expensive.

Gordon, N. F., H. Tsujimura and C. L. Cooney, "Optimization and Simulation of Continuous Affinity Recycle Extraction", Bioseparation 1, 9-12 (1990) described a process using well-mixed flow reactors as opposed to fluidized bed and reported the continuous affinity recycle extraction of proteins. This system, although simple and easy to control, has the disadvantage of employing a stirred tank system which gives low efficiency per stage and large processing volumes are essential for even moderate throughputs.

U.S. Pat. No. 6,716,344B1, for "Liquid solid circulating fluidized bed", (2004), and US Patent Publication No. 2004/0226890A1 "Method for recovering ionic products" (2004) discloses a liquid solid circulating fluidized bed (LSCFB) preferably for use as an ion exchanger, and consists of two fluidized bed columns, one fluidized bed adsorber (downcomer) operating in conventional fluidized bed mode for adsorption of ions of interests and wherein the upflowing fluid keeps the adsorbent particles fluidized and the adsorbent particles themselves are in net downward flow and out of the bed into the second fluidized bed that operates in riser mode and carries the adsorbent particles up in concurrent flow of eluting medium while performing solute desorption of ions to provide eluted solute as well as regenerated adsorbent particles. Further, according to the invention, the Ion exchange adsorbent particles are separated and re-fed into the top of the first adsorbent downcomer bed. Thus in effect, the adsorbent particles are circulated continuously between the riser and the downcomer i.e. the particles that have adsorbed ions in the adsorber are passed from the downcomer to the desorber riser where elution occurs and the particles are returned to the adsorber near the top of the adsorber column. Such downcomer-riser combination of expanded and fluidized beds placed one beside other in an LSCFB can be used in processes for continuous recovery of ions of interests. However, the apparatus disclosed is useful only for single stage operations wherein only one component adsorbs and eluted to give regenerated adsorbent, or a set of components adsorbs and is eluted as the set of adsorbed components to give regenerated adsorbent. Further, two operations namely, elution and regeneration are performed together in same column (riser) in co-current mode, thus having low elution efficiency and leading to diluted elution of adsorbed component while also in many cases resulting in insufficient regeneration of the adsorbent. The apparatus disclosed does not consist of separate chambers or sections for elution and regeneration of adsorbent particles for the cases where separate steps are required for selective elution of adsorbed component and regeneration of adsorbent particles. Further, another disadvantage of the system is the fact that for steady operation the system requires stringent pressure balance for the desired circulation of solids.

U.S. Pat. No. 3,879,287, "Continuous ion exchange process and apparatus" (1975) relates to an apparatus for continuous ion exchange separation. However, the process described is a semi-continuous process as the recommended eluting means is a batch wise conventional fixed bed ion exchange process.

U.S. Pat. No. 4,279,755: "Continuous countercurrent ion exchange process" (1993) relates to a continuous countercurrent ion exchange process for absorbing ions of interest onto ion exchange particles from a feed liquor containing ions which when absorbed on the particles cause the density of the particles to increase. The process comprises the steps of (1) flowing the feed liquor upwardly through a main bed of ion exchange resin particles contained in a main chamber of an absorption column and thereby maintaining the bed in fluidized state; (2) continuously collecting the denser loaded particles from the lower region of the absorption column; (3) passing an outflow of the feed liquor from the upper region of the main chamber upwardly into the lower region of the polishing chamber containing a secondary bed of fluidized ion exchange resin particles whereby residual ions of interest are polished from the liquor, and (4) producing a barren liquor flowing out of the upper region of the polishing chamber. This invention is also a semi-continuous process as the stripping and the regeneration of the loaded ion exchange particles cannot be performed in this device.

Further, U.S. Pat. No. 3,207,577; U.S. Pat. No. 3,235,488; U.S. Pat. No. 3,152,072; U.S. Pat. No. 3,240,556; U.S. Pat. No. 3,551,118; U.S. Pat. No. 4,018,677; U.S. Pat. No. 4,035,292; U.S. Pat. No. 4,035,292 and U.S. Pat. No. 4,035,292 incorporated herein for the purpose of reference do not disclose the apparatus, and in particular, the fluidized moving bed and/or expanded moving bed for continuous countercurrent contact between a liquid to be treated and solid particles wherein the steps of adsorption, washing, elution and regeneration, are carried out in continuous countercurrent mode.

Thus the designing of new continuous countercurrent fluidized/expanded moving bed having high efficiency and productivity is desirable.

BRIEF DESCRIPTION OF THE PRESENT INVENTION

It is an object of the present invention to provide a continuous countercurrent fluidized moving bed and/or expanded moving bed, more specifically multistage continuous countercurrent fluidized moving bed and/or expanded moving bed for recovery, purification, and chemical/enzymatic reaction of single or multiple component/s of interest, for example biomolecules, synthetic/semisynthetic active pharmaceutical ingredients, intermediates, derivatives, contaminants/impurities, value added products, metals etc., by contacting liquid mixture containing the component/s with the solid adsorbent in countercurrent mode. It is also an object of the present invention to provide efficient equipment and process for continuous recovery, purification and reaction of molecule/s from a mixture and performing not only the adsorption but also the washing, elution, regeneration and equilibration steps using respective different or similar liquid phases and contacting the liquid phases and solid adsorbent in a continuous countercurrent mode. Further, it is also an objective of the present invention to provide the equipment with independent control over process variables at every stage for total ease and control of each of the operations namely adsorption, washing, elutions, regeneration and equilibration.

An embodiment of the present invention provides the composite continuous countercurrent fluidized moving bed and/or expanded moving bed system comprising number (n) of fluidized/expanded moving bed stages/columns; one or more means to feed solid adsorbents to the top of the first stage/column from a solid adsorbent feed hopper above it; from the bottom of the said first stage/column to the top of the second stage/column located below the said first stage/column; and so on till the top of the last $n^{th}$ stage/column from bottom of the $(n-1)^{th}$ stage/column located above the $n^{th}$ stage/column; the means to collect said solid adsorbent from the $n^{th}$ stage/column to a solid adsorbent collection tank; the means to control the flow of said solid adsorbents from one stage/column to next stage/column; the means to feed primary liquid adjacent to the bottom end of each stage/column and the means to feed secondary/auxiliary liquids at the bottom of each stage/column along with the means to evenly distribute both primary and secondary/auxiliary liquids while entering inside the said respective stage/column; and the means for outflow of both liquids together at the top end of respective stage/column; the means to collect said solid adsorbents from last bottom most $n^{th}$ stage/column; and the means to transport back the said solid adsorbent from collection tank to the top of said first stage/column through the said solid adsorbent feed hopper.

Preferred embodiment of the present invention provides a composite continuous countercurrent fluidized moving bed and/or expanded moving bed system comprising numbers (n) of fluidized/expanded moving bed stages/columns vertically stacked one over the other, placed alongside the other at same or different elevation, or in circular or any other suitable arrangement known to those skilled in art.

Another preferred embodiment of the present invention provides said continuous countercurrent fluidized moving bed and/or expanded moving bed system comprising of fluidized/expanded moving bed stages/columns vertically stacked one over the other for sequentially carrying out adsorption/binding, washing, desorption/elution, regeneration/cleaning-in-place/sanitization-in-place and equilibration/conditioning of adsorbent particles in a continuous counter current mode in each stage/column.

Another preferred embodiment of the present invention provides one or more means to feed solid adsorbents called 'solid downcomer tubes/lines' at the top of said first stage/column from a said solid adsorbent feed hopper, and at the top of the said second stage/column from said first stage/column located above the said second stage/column, and so on similarly to the top of the said last $n^{th}$ stage/column from said $(n-1)^{th}$ stage/column located above the said $n^{th}$ stage/column. The one or more solid downcomer tube/s originating from the secondary distributor plate or auxiliary fluidized/expanded section, and opening at the top of the next fluidized/expanded bed below, are of sufficient length so as to dip well in to the liquid level in the lower stage/column but yet clear above the expanded/fluidized bed of adsorbent phase, so as to prevent the loss of solid adsorbents by over flow with outgoing liquid.

Another preferred embodiment of the present invention provides said one or more 'solid downcomer tubes' to feed said solid adsorbents at the top of the said second stage/column from said first stage/column located above the said second stage/column and so on similarly to the top of the said last $n^{th}$ stage/column from said $(n-1)^{th}$ stage/column located above the said $n^{th}$ stage/column, and said 'solid downcomer tube/s' is either centrally or side located.

In the preferred embodiment of the present invention the flow of solid adsorbent through the said solid downcomer tube/s is controlled using valves appropriate to afford control over the downward adsorbent slurry flow.

Another preferred embodiment of the present invention provides any means intended to distribute the falling solid adsorbents evenly over the cross section of the stage/column from all the solid downcomer tube/s together.

Another preferred embodiment of present invention provides said means at the bottom opening of the solid downcomer tube/s is solid-liquid distributor with or without perforations. If the perforated solid distributor is used, the size and arrangement of the perforations is determined by size and size distribution of said solid adsorbents.

Yet another preferred embodiment of present invention provides said means to feed primary liquids e.g. crude feed to first stage, washing liquid to second stage, elution liquid to third stage, regeneration liquid at fourth stage and equilibration liquid at fifth stage, adjacent to the bottom end of each stage/column of the said fluidized moving bed/expanded moving bed system, wherein said liquid gets evenly distributed through a centrally located primary perforated distributor, located at specified height from the bottom of the respective stage/column, or through a perforated plate distributor to create fluidized/expanded section, wherein effective continuous countercurrent contact of said solid adsorbent moving in downward direction and liquids moving in upward direction occurs, and the discharge of said liquids injected to the respective stage/column is done through the means (one or more) for the outflow of liquids, located adjacent to the top end of respective stages/columns.

Yet another preferred embodiment of present invention provides said means to feed secondary/auxiliary liquids at the bottom of each stage/column through a secondary perforated distributor to create auxiliary fluidized/expanded section below primary fluidized/expanded section for effective washing of said adsorbents occurs in continuous countercurrent manner and to prevent intermixing of two different liquids between two adjacent stages/columns, and the discharge of said liquids injected to the respective stage/column is done through the means (one or more) for the outflow of liquids, located adjacent to the top end of respective stages/columns.

Yet another preferred embodiment of present invention provides said means said means for outflow of liquids i.e. primary and secondary/auxiliary at respective stages/columns is far-off from the said primary and secondary/auxiliary liquids feed points. The distance between said means for outflow and said primary and secondary/auxiliary liquids feed points is same or different for the said stages/columns, and is determined by type of stage/column i.e. adsorption, washing, elution, regeneration and equilibration stage/column. The contact of said liquids and said solid adsorbents is in countercurrent manner in each of these stages/columns.

Another preferred embodiment of present invention provides said means to collect said solid adsorbents from $n^{th}$ or last stage/column by means of solid downcomer tube/s into the solid adsorbent collection tank, wherein said solid adsorbents are kept in fluidized/expanded state by injecting regenerating or equilibrating liquid.

Yet another preferred embodiment of present invention provides means to transport said solid adsorbent back to the said first stage/column through said solid adsorbent feed hopper, by using pump/s or by one or more liquid-solid ejector system. The said solid adsorbents in feed hopper were kept in fluidized/expanded state by pumping regenerating or equilibrating liquid through the bottom of the feed hopper thereby maintaining smooth flow of said solid adsorbents into the said first stage/column through said solid downcomer tube/s.

In the preferred embodiment of the present invention of the continuous countercurrent fluidized moving bed and/or expanded moving bed system, the said first stage/column is operating in fluidized/expanded bed mode, to which the solids are continuously fed from the top using solid downcomer tube/s, and are continuously taken out from the bottom of the said first stage/column after specified residence time, wherein the net movement of the solids is against the liquid flowing in upward direction through the said stage/column, and sedimenting solids from the said first stage/column are continuously fed to the top of the second stage/column, also operating in continuous countercurrent fluidized/expanded bed mode, where again countercurrent contact of said solid adsorbents with second up flowing liquid is carried out. The said sedimenting solids from the said second stage/column are now removed from the bottom of the said second stage/column and fed to the top of the third stage/column also operating in continuous countercurrent fluidized/expanded bed mode, and is further carried to the next stages/columns and contacted with respective up flowing liquid phase in a countercurrent made in a similar manner described above. The system described herein can be a single or multistage/column system depending upon number of stages involved or required in the particular process. The sedimenting adsorbent solids from the last stage/column of said fluidized moving bed or expanded moving bed are taken out continuously and fed back to the top of the said first stage/column, through said solid feed hopper to which the adsorbent solids are transported by means of pump or liquid solid ejector, or any other suitable device known to those skilled in art, and wherein the said solid feed hopper is suitably designed and operated, for examples in fluidized/expanded moving bed mode, in such a way to deliver the solids to the top of the said first stage/column continuously in a controlled manner. The flow of the adsorbent phase from one stage to another in downflow sedimenting mode is controlled by valves that can be operated between the stages.

Yet another preferred embodiment of present invention provides continuous countercurrent fluidized/expanded moving bed system comprising of four stages/columns for carrying out first four steps as described above, and performing the equilibration step in the said solid feed hopper itself by providing equilibration liquid for the fluidization/expansion of said solid adsorbent particles in the said feed hopper, so as to have slurry of required concentration, and is fed at the top of the said first stage/column through said solid downcomer tube/s. Hence, the said solid feed hopper can serve the dual role of equilibration as well as providing fresh/regenerated solids to the top of said first stage/column at required solid concentration and flow rate.

Still another embodiment of present invention provides multiple number of fluidized/expanded moving bed stages/columns vertically stacked one over the other, wherein length of each stage/column is same or different depending up on process requirements. The height of the expanded/fluidized adsorbent bed in each stage/column is maintained by controlling solid inventory in every stage/column through said solid downcomer tubes/and the flow rate of the primary and secondary/auxiliary liquid phases.

Another embodiment of present invention provides the means of connecting one stage/column to another stage/column further includes washer zone for washing of said solid adsorbents before they fed to the top of the next stage/column through one or more said solid downcomer lines.

In the preferred embodiment of the present invention of the composite continuous countercurrent fluidized moving bed and/or expanded moving bed system, wherein any stage/column is selected to operate as an adsorber, operating in continuous countercurrent fluidized bed/expanded bed mode, and wherein the some or all the component/s in the feed coming in through the primary central distributor adsorb on the said adsorbent particle phase. The countercurrent settling adsorbent phase with adsorbed component/s is washed in countercurrent mode in the same stage/column by up flowing auxiliary fluid coming in through bottom perforated secondary distributor in the auxiliary fluidized/expanded section. The adsorbent phase is carried to the next stage/column through the said solid downcomer tube/s. This next stage/column serves as optional washing stage wherein the settling particles are further washed in a countercurrent fashion by the washing liquid moving in upward direction, and thus washed said adsorbent particles is carried to the next stage/column in the same fashion as they came in from the adsorber stage/column, with the difference that in the second stage both primary and auxiliary phases are simply the washing liquid phase. The next stages/columns are desorber stages/columns, wherein the said adsorbent particle phase is sequentially contacted with desorbing liquid/s in countercurrent fashion to sequentially desorb the one or more adsorbed component/s from the said adsorbent phase, and adsorbent phase after final desorption stage/column is carried to the next stage/column for regeneration in countercurrent mode by treating with a suitable regenerating liquid phase. The regenerated solid adsorbent phase flows in to the next equilibration or conditioning stage/column, wherein suitable equilibrating liquid is used for equilibration of said solid adsorbents before feeding back to the adsorber stage/column.

In another embodiment of the present invention, if the equilibrating stage/column is used as last stage/column, the said solid adsorbent phase flows from last stage/column into the solid adsorbent collection tank. The equilibrated solid adsorbent phase collected in the bottom solid adsorbent collection tank is then re-circulated back to the said solid feed adsorbent hopper located at the top side of the said first stage/column or directly passed at a controlled flow rate in to the top of the said first stage/column. The transportation of the regenerated or equilibrated solid phase to the top of the first stage/column or to the solid feed hopper is performed using a pump or a combination of one or more liquid-solid ejectors and hydraulic transport system.

Yet another embodiment of present invention provides the stage/column, wherein the desorption/elution is carried out in countercurrent mode, and regenerated solid adsorbents are re-circulated to the said solid feed hopper or to the top of the top said first stage/column after equilibration in the manner as described above.

In another preferred embodiment of the present invention said solid adsorbents are washed at the bottom of every stage/column before entering into the next stage/column, by an auxiliary liquid flowing through the perforated distributor located at the bottom of every stage. The primary liquid phase in each stage/column is fed in through the central distributor located at a specified height above the bottom of each stage/column. The combined flow rate of primary and auxiliary liquid phases flowing upward maintains the solid particle adsorbent phase in a downward settling fluidized/expanded state.

Yet another embodiment of present invention provides the stages/columns placed alongside the other and at same or different elevation, and in circular or any other arrangement known to those skilled in art. The number of such stages/columns depends on number of steps involved in the process. Solid adsorbents were taken out from the bottom one stage/column and transported to another stage/column by means comprising pump, hopper (such as hydro-cyclone) and solid transport lines or liquid-solid ejector, hopper (such as hydro-cyclone) and solid transport lines or any other means known to those skilled in art. The said solid adsorbents from the last stage/column are transported back to the said first stage/column by means of solid transportation system described above.

Yet another preferred embodiment of the present invention provides composite continuous countercurrent fluidized moving bed and/or expanded moving bed system to carry out all steps in adsorptive chromatographic separation/purifications such as adsorption, washing, elution/s, regeneration and equilibration are carried out in separate stage/column, wherein all stages/column are operated in continuous countercurrent mode so as to benefit the productivity.

In another embodiment said continuous countercurrent fluidized moving bed and/or expanded moving bed system of the present disclosure is useful for extraction, recovery, isolation, separation, purification and reaction of single or multiple product(s) of interest from sources in pure, partially pure or impure form.

Thus the potential applications of the disclosure are believed to be suitable to include but is not limited to the extraction, recovery, isolation, separation, purification and reaction of ionic, non-ionic, zweitter-ionic active principles, intermediates, metals or mixture thereof useful for human, veterinary, environmental or agricultural applications from modified or unmodified natural or non-natural sources. Therefore, the present disclosure can be easily applied to an industrial scale.

Preferably the entire continuous countercurrent fluidized moving bed and/or expanded moving bed system can be used to recover and/or purify component/s from the mixture by adsorption using ionic, non-ionic, mixed mode or zwitterionic modes of interactions. The mixture of components may be obtained by chemical/biochemical synthesis such as chemical reaction, enzymatic transformation/catalysis; bio-synthesis in fermentation by genetically modified, improved or unmodified microorganisms; from plant/s or plant cell culture, animal/s or animal cell culture; transgenic plants; transgenic animals; sea water; waste water from any industrial or other activity; and/or combination of one or the other of all the above, in a suitable way known to those skilled in the art.

Preferably the component/s adsorbed is/are ionic, non-ionic or zwitterionic and is/are large molecule/s such as protein/s, polysaccharide/s, nucleic acid/s, protein aggregates, endotoxins etc. and obtained by means of any of the sources or techniques as described above.

Preferably the component/s adsorbed is/are ionic, non-ionic or zwitterionic and is/are small molecule/s such as peptide/s, vitamin/s, antibiotic/s, steroid/s, sugar/s, metal/s or any known chemical/biochemical compound and derivatives thereof.

Preferably the component/s adsorbed is/are micro or nano-particle/s such as plant/animal/microbial cells, gene therapy vectors, viruses, virus like particles, phages etc. or particles having similar nature.

Preferably the apparatus described herein is used for to carry out chemical or biochemical reaction combined with adsorptive purification in an integrated or non-integrated manner.

Preferably the feed liquid used for the recovery and/or purification of component/s, such as fermentation broth containing solid or particulate matter and relatively low concentration of target component/s. In such cases the traditional choice of unit operation for handling of solid or particulate matter is either filtration or centrifugation or combination thereof, which not only adds in the operational and capital cost but also leads to increased product loss due to additional step in processing. The continuous countercurrent fluidized moving bed and/or expanded moving bed (FMB and/or EMB) system of the present invention is an integrated unit operation which can perform recovery and purification of component/s from unclarified feedstocks such as containing suspended solid or particulate matter.

Preferably the system operates continuously in fluidized or expanded moving bed mode with countercurrent contact of solid phase with liquid mobile phase in all stages/columns, wherein the solids are adsorbent particles or catalyst particles, porous or non-porous, and are commercially available or prepared by any means known to those skilled in arts.

Preferably the system operates continuously in expanded or fluidized moving bed mode with countercurrent contact of settling solid particles with upflowing liquid in all stages/columns, wherein the solids are the adsorbent particles or a catalyst and is commercially available or prepared by any means known to those skilled in arts.

The system is useful not only for efficient adsorption but also for efficient and low volume desorption, regeneration, and equilibration of adsorbent or catalyst particles. Thus the invention eliminates the need for additional and separate unit operation/s as well as circumvents the problems associated with conventional batch, semi-continuous or continuous (adsorption) processes.

In the present disclosure, the singular forms "a", "an", and "the" include plural reference also unless the context clearly dictates otherwise. Thus, for example, a reference to "stage/column" includes singular or a plurality of such stages/columns, and a reference to "liquid" is a reference to one or more liquids equivalents thereof known to those skilled in the art. Similar syntactical principal also applies to other examples such as adsorbent, component, solid transport line and valve.

BRIEF DESCRIPTION OF THE ACCOMPANYING DRAWINGS

Further features, objects, and advantages will be evident from the following detailed description of the preferred embodiments of the present invention taken in conjunction with the accompanying drawings in which.

Further features, objects, and advantages will be evident from the following detailed description of the preferred embodiments of the present invention taken in conjunction with the accompanying drawings in which.

DETAIL DESCRIPTION THE PREFERRED EMBODIMENTS OF THE PRESENT INVENTION

Referring to FIGS. 1, 2 3 and 4 the present invention consists of number of fluidized/expanded bed stages/columns equal to the number steps like adsorption, washing, elution, regeneration, equilibration etc. involved in the desired operation of the process. These stages/columns are stacked one over the other, each connected to the next section below by way of one or more downcomers tubes that pass solid particle phase downwards while keeping the main liquid mobile phase in the two sections segregated. Each stage/column of the present invention is operated continuously in countercurrent mode and having independent control.

Feed tank 1 is used as the feed hopper to charge the fresh or recycled regenerated and/or equilibrated solid particle phase (for example adsorbent particles) to the top of the first stage/column through top solid transport line 2, wherein the solid slurry flow rate is controlled by valve 3. Solids in the feed hopper 1 are kept in fluidized/expanded state on a flow distributor plate 5 by a liquid such as water or the equilibration liquid phase charged through bottom inlet 4 of feed hopper 1. The feed hopper 1 is provided with top outlet 6 for the discharge of excess liquid entering into the hopper, and means 7 of filtering the said liquid to retain and avoid any loss of solids.

Figure 1:
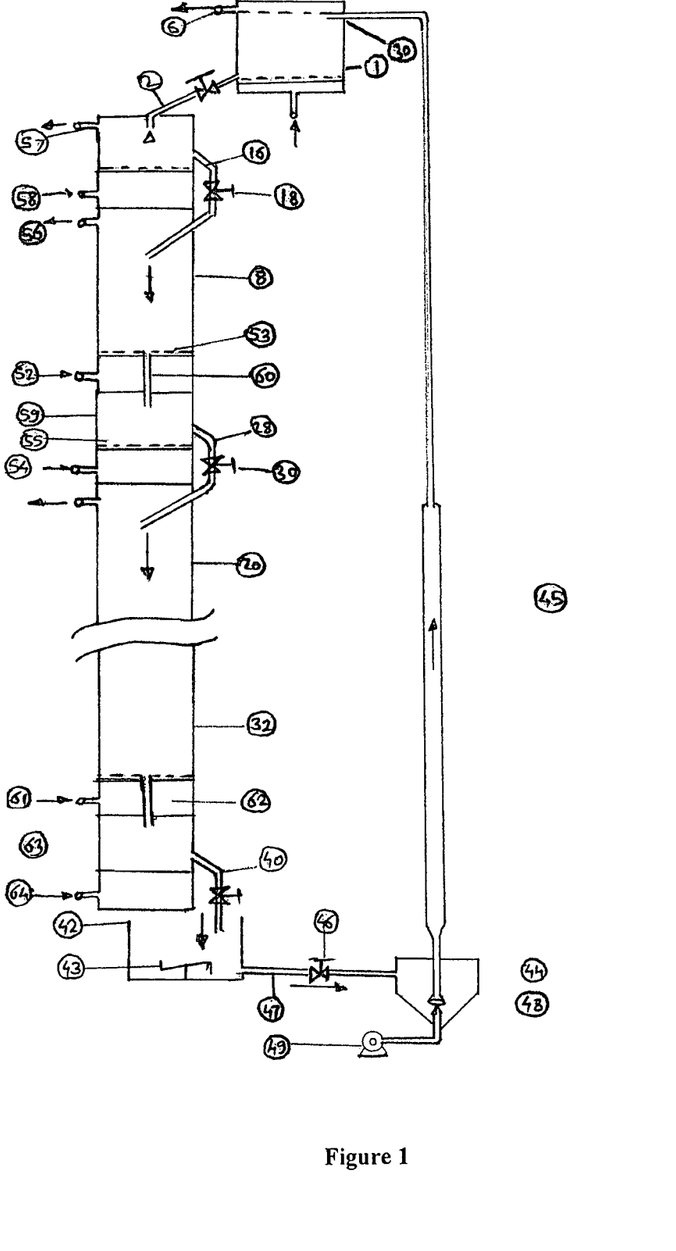
FIG. 1: Schematic of continuous countercurrent fluidized moving bed and/or expanded moving bed system with side solid downcomer tube/s and liquid-solid ejector system for transportation of solid adsorbents.
Figure 2:
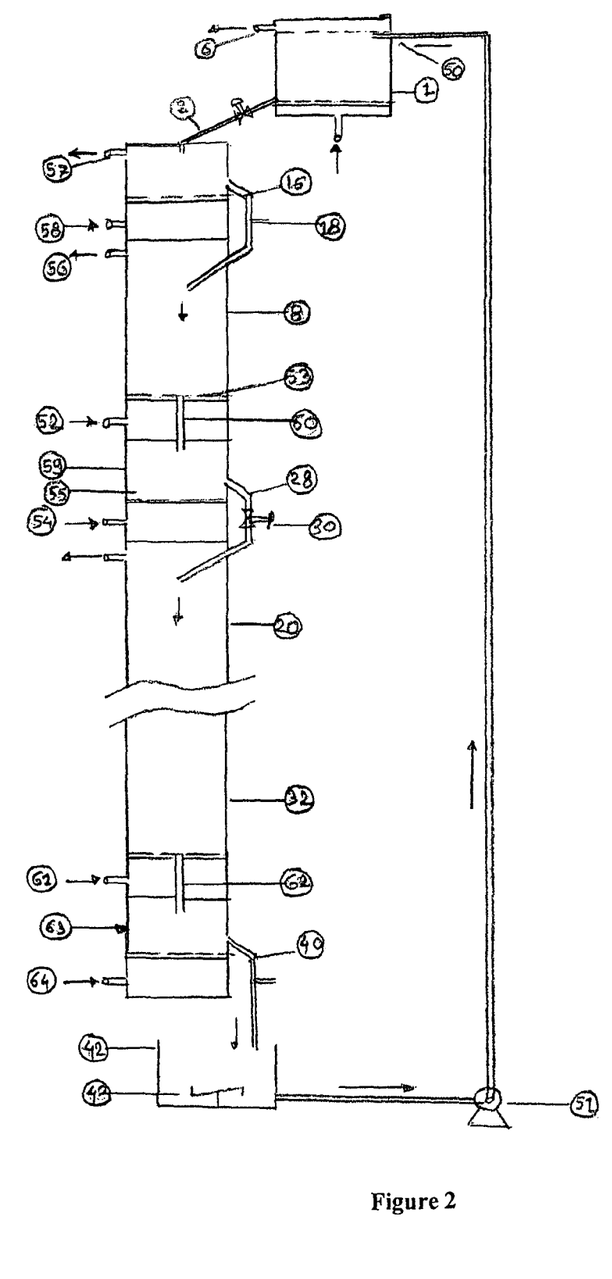
FIG. 2: Schematic of continuous countercurrent fluidized moving bed and/or expanded moving bed system with side solid downcomer tube/s and pump system for transportation of solid adsorbents.

In the preferred embodiment of the present invention the first stage/column 8, to which the solids are fed at the top through top solid downcomer line 2, is provided with a device 9 at the opening of the opening of the solid downcomer line 2 that ensures even dispersion of solids in the primary or main expanded/fluidized bed section or the first stage/column 8. The primary liquid (for example, feed containing the adsorbing solute) is fed to the first stage/column 8 at the bottom through inlet 10 and is distributed evenly to the stage/column 8 through the distributor which is either perforated plate distributor 53, as here in FIG. 1 and FIG. 2, or a central distributor 11 as in FIG. 3 and FIG. 4. The secondary or auxiliary liquid is pumped through the inlet 12 and is passed in upward direction through the perforated plate distributor 13 or 55 which supports the down settling solid phase in expanded/fluidized state in what is called the secondary or auxiliary section 65. The combined liquids, primary plus secondary fed to the first stage/column, now comprising the primary or main section and the secondary or auxiliary section, are discharged at the top of the main section 8 through the outlet 57-*b* as in FIGS. 1 and 2, and outlet 14 as in FIGS. 3 and 4. The liquid flowing in upward direction through the said first stage/column 8 is adjusted to a given flow velocity that keeps the solids in fluidized/expanded bed mode, wherein the contact of the said solids to the said upward flowing liquid is countercurrent to the down settling solid phase thus leading to higher efficiency of the stage/column 8 compared to cases wherein solids remain with zero net flow as in traditional packed or expanded/fluidized beds. The sedimenting solids are continuously removed from the bottom of the stage/column 8 as they pass into the auxiliary section through one or more solid downcomer lines or tubes located centrally 15 (FIGS. 3 and 4) or as side arms 16 (FIGS. 1 and 2). The solid flow rate in the downcomer is controlled by a valve 17 (in FIGS. 3 and 4) or 18 (in FIGS. 1 and 2) respectively, and are fed to the top of the next stage/column 20. The distributor 11 (FIGS. 3 and 4) or 53 is located at a specified height 19 from the perforated plate distributor 13 or 55.

In the preferred embodiment of the present invention the design of stage/column described above (schematically shown in FIGS. 1, 2, 3, 4 and 6) is used for the design of single stage, two stage or multi-stage/column fluidized moving bed and/or expanded moving bed system depending upon the number of steps desired in a process.

In the preferred embodiment of the present invention referring to FIG. 2, the first stage/column, wherein the primary liquid is charged through the inlet 52 and passed through the distributor 53, and secondary or auxiliary liquid is charged through inlet 54 and passed through distributor 55. Both liquids flows in upward direction against the sedimenting solids, and are discharged through the outlet 56 located at the top of the said stage/column. The liquid flowing in upward direction keeps the solids in fluidized/expanded state, whereby the contact of the solid particles with the liquid is countercurrent. There is provided a zone, for example washing zone, between the two distributors 53 and 55, also called the secondary or auxiliary section 65. The solids are carried from one stage/column to another stage/column by side arm 16, controlled through valve 18.

In the preferred embodiment of the present invention the design of stage/column described above (for FIG. 2) is used for the design of single, two stage or multi-stage/column fluidized moving bed and/or expanded moving bed system depending upon the number of steps in the process.

In the preferred embodiment of the present invention the solids from the last stage/column 32 are removed continuously from bottom downcomer outlet 39, and are collected in a tank 42, where the solids may be or may not be kept in suspension by means of stirring 43, or by using a liquid fed through bottom inlet. These solids are continuously transported to feed tank 44 equipped with a slurry pump or a liquid solid ejector 45. Alternatively, the downcomer of the auxiliary section of the stage/column can also discharge solids directly in to the feed tank 44. Backflow of slurry of solids is prevented by using non return valve 46 located in solid transport line 47 connecting to tank 42 and feed tank 44 with the liquid solid ejector 45. The said solids are then continuously fed to the top feed hopper 1 using liquid solid ejector 45. The feed tank 44 is provided with a nozzle 48 at an optimized distance, and the driving liquid required to carry the solid particles to the hopper 1 is pumped through said nozzle 48 using pump 49. Alternatively, the solids collected in the tank 42 can be transported to the hopper 1 by using pump 51 as shown in FIG. 2. The said slurry is fed continuously to the hopper 1 through inlet 50. The said inlet 50 can be at the top of the hopper 1 or may be at the bottom 4. Solids received by the hopper 1 in the manner described can be fed in controlled manner to the top of the first stage/column 8 continuously as explained above.

In the preferred embodiment of the present invention referring to FIGS. 1 to 4 the stages/columns arranged one above the other to provide a two or multi-stage/column system, wherein first stage/column 8 is connected to second stage/column 20 in the manner described above, and so on till the n number of stages/columns determined by the specific process steps required in the operation. The bottom last stage/column 32 from which the solids are removed and are re-circulated to the top of the first stage/column 8, using liquid solid ejector 45 or pump system 51, and through the hopper 1 continuously at a required solid concentration and flow rate.

In the preferred embodiment of the present invention referring to FIG. 1 the said solids coming from top feed hopper 1 can be taken to a stage/column 57 before entering into first stage/column 8, and which works like the auxiliary section described above, and whereby the said solids can be continuously washed or equilibrated. The solids in the stage/column 57-*a* are kept in the fluidized/expanded state by a liquid injected through inlet 58 flowing in upward direction. In the said stage/column 57-*a* the contact of the said solids and liquid is countercurrent.

Figure 3:
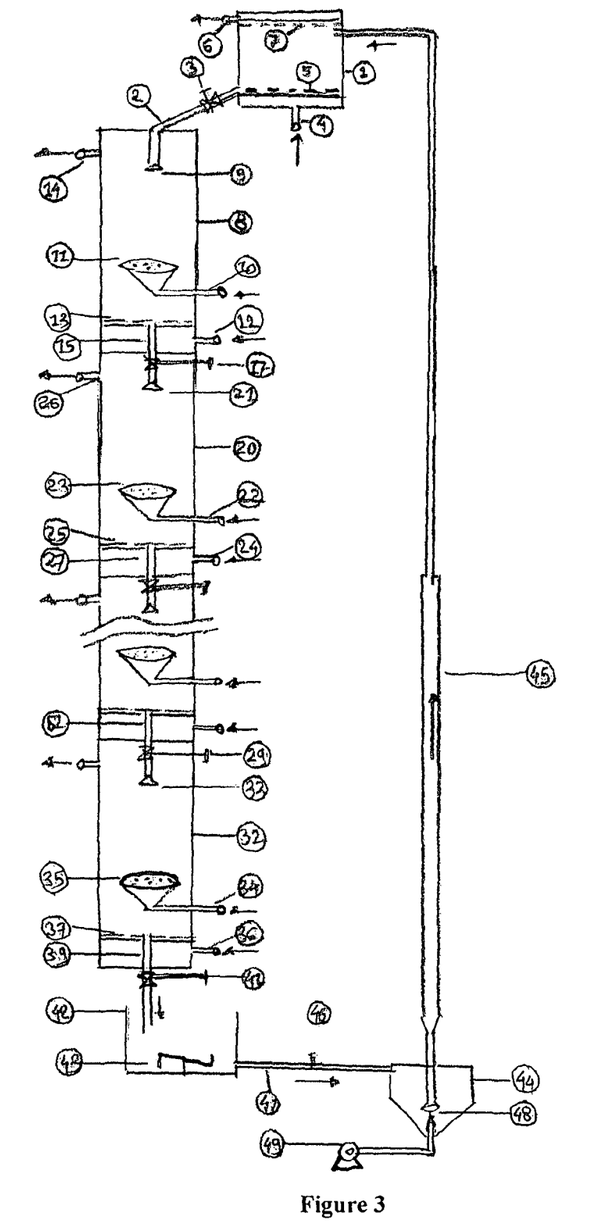
FIG. 3: Schematic continuous countercurrent fluidized moving bed and/or expanded moving bed system with centrally located solid downcomer tube/s and liquid-solid ejector system for transportation of solid adsorbents.
Figure 4:
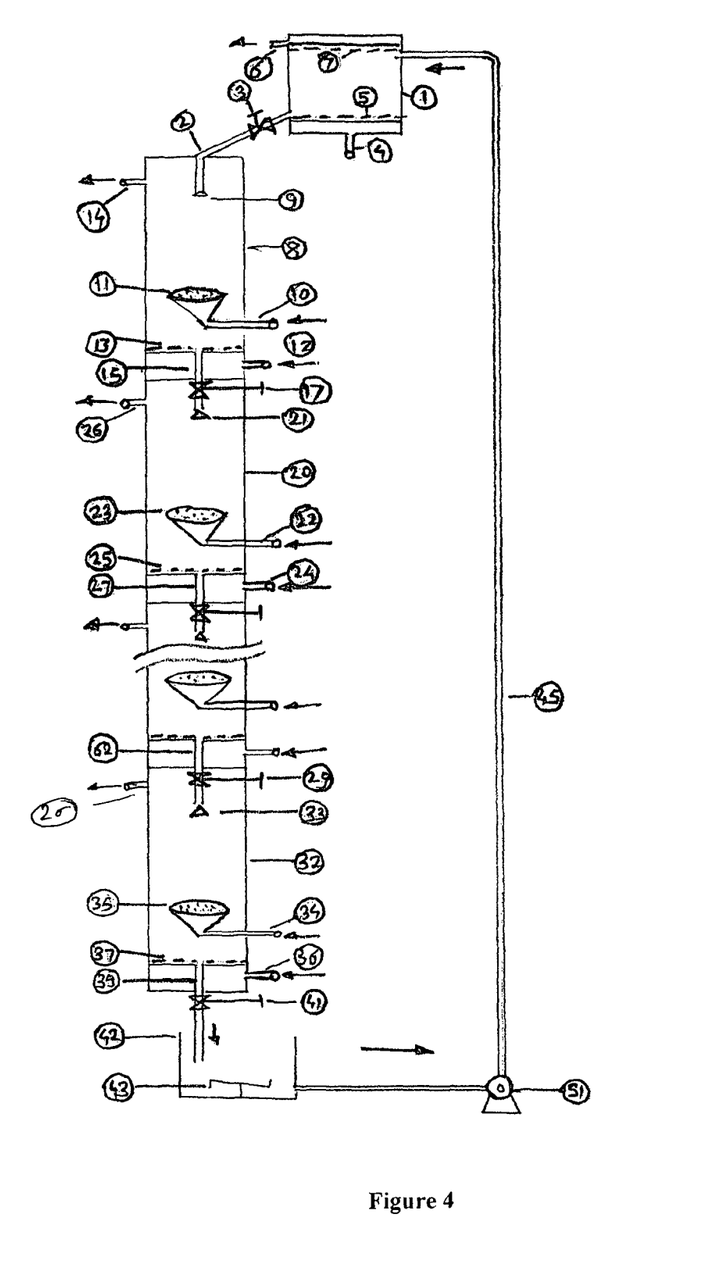
FIG. 4: Schematic continuous countercurrent fluidized moving bed and/or expanded moving bed system with side solid downcomer tube/s and pump system for transportation of solid adsorbents.
Figure 5:
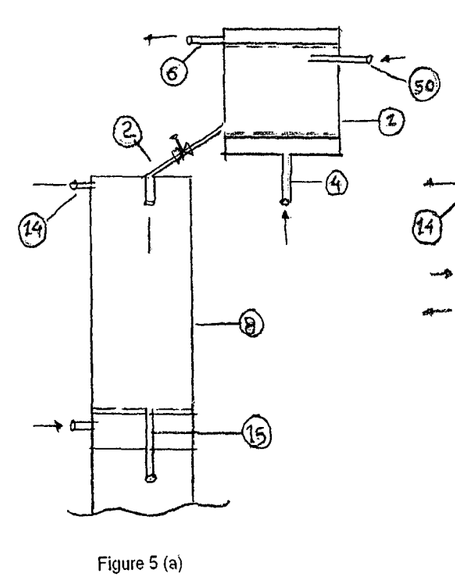
FIG. 5: Schematic showing different combination of solid downcomer tube/s with stages/columns and with solid adsorbent feed hopper.
Figure 6:
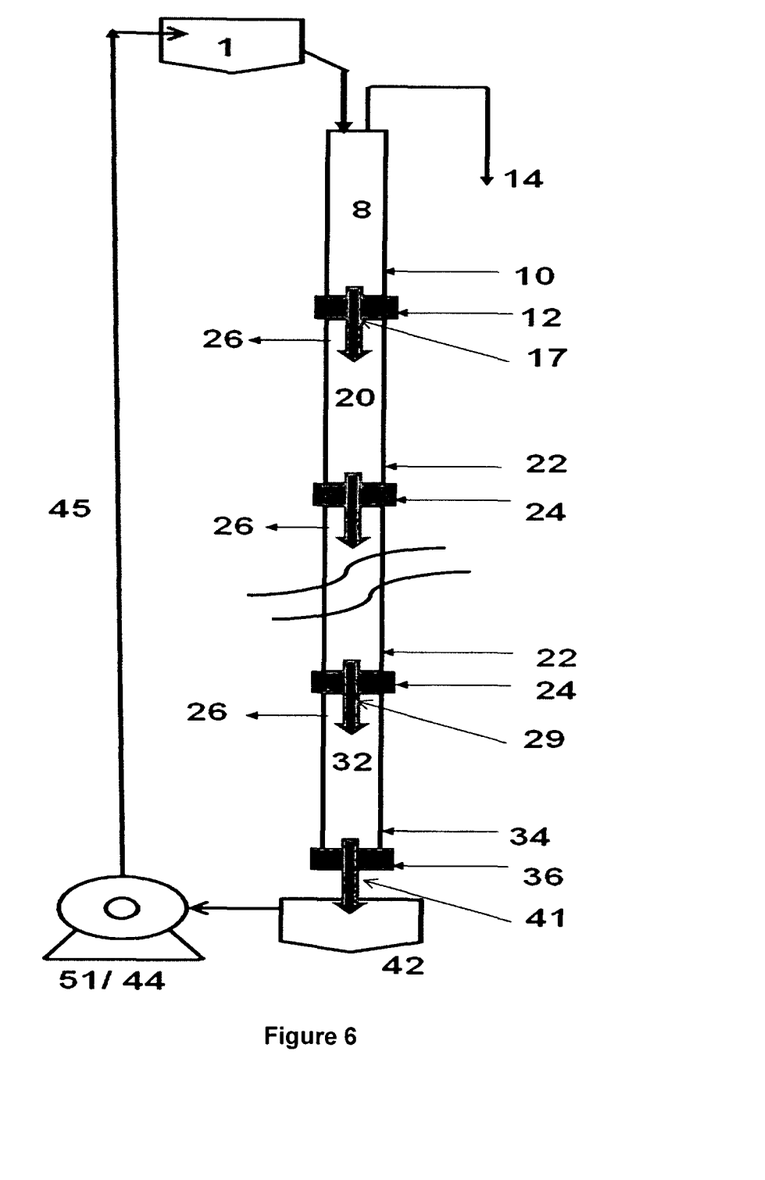
FIG. 6: Schematic showing composite countercurrent fluidized moving bed and/or expanded moving bed system

In the preferred embodiment of the present invention referring to FIGS. 1 to 4 wherein the function of the first stage/column 8 is continuous adsorption of target component/s on the solids (preferably adsorbent particles) in a countercurrent mode, from the feed liquid charged through the inlet 10 or 52. The solids to which the target component/s is adsorbed are continuously washed in the same stage/column (as shown in FIGS. 2 and 4) by the secondary/auxiliary liquid charged through inlet 12 in the continuing secondary or auxiliary section 65. Alternatively, the said solids can be continuously taken to intermediate stage/column 59 (as shown in FIGS. 1 and 2) through solid transport line 60, wherein the said solids are washed countercurrently by a secondary/auxiliary liquid injected through inlet 54 in a separate auxiliary section 65. The said solids (to which the target component/s is adsorbed) after washing are continuously carried to the second stage/column 20 which is also equipped with a primary main followed by the auxiliary section in the same manner as stage/column 8, through one or more downcomer tubes or solid flow line 15 or 28, wherein the target component/s are desorbed/eluted by a liquid injected through the bottom inlet 22 and/or 24. For the recovery and/or purification of individual component from mixture of components adsorbed on the said solids (in the first stage/column) can be carried out by adding number of said second, third, fourth and so on stages/columns after said first stage/column depending upon number of individual components or group of component/s required to be isolated, and arranged in the same manner as the top two stages/columns. The said solids in the second stage/column, or the last elution stage/column, after desorption/elution of all desired components, gives the regenerated solids, which are carried to the next stage/column through solid transport for the regeneration. The regenerated solids can be then equilibrated in the last stage/column 32 by an equilibrating liquid injected through inlet 34 and/or 36 (as shown in FIGS. 3 and 4) or through inlet 61 or 64 (as shown in FIGS. 1 and 2) in a countercurrent mode: The said equilibrated solids from the last stage/column 32 are continuously removed and transported to the top of the first stage/column 8, using liquid solid ejector 45 or by pump system 51, through feed hopper 1 for reuse/recycle of the solids in the FMB/EMB system.

Alternatively, the bottom last stage/column in the system (32 in FIGS. 1 to 4) can be used for the continuous regeneration of the said solids in countercurrent mode, by injecting a regenerant liquid through the inlet 34 and/or 36 (as shown in FIGS. 3 and 4) or through inlet 61 or 64 (as shown in FIGS. 1 and 2). In the case the regenerated solids are continuously removed from the bottom of last stage/column 32 and are transported to top of the first stage/column 8 using liquid solid ejector 45 or by pump system 51, through feed hopper 1. Here the hopper 1 performs the function of equilibration of the said solids, and supply of equilibrated/fresh solids to the fist stage/column through top solid transport line 2 for reuse/recycle of said solids

PROSPECTIVE APPLICATIONS OF THE TECHNOLOGY

The prospective applications of the invention that the invention is supposed to be appropriate for comprise but are not limited to:

i) Adsorption chromatographic and/or negative adsorption chromatographic recovery and purification of component/s from biological or non-biological sources ii) To carry out the chemical or biochemical reactions such as enzymatic transformation/catalysis, and/or further integration of recovery and purification of the product and/or impurities generated by said processes iii) For integrated recovery and/or purification of fermentation (for example microbial fermentation) or cell culture (animal, plant) based products in an integrated or non integrated manner iv) For the recovery and/or purification of products obtained from transgenic plants or animals v) For the recovery and/or purification of products from genetically engineered microbial sources, plants, animals etc.

vi) For the recovery and/or purification of multiple products from single feedstock, chemical or biotechnological, or natural.

vii) For recovery and/or purification of synthetic active pharmaceutical ingredients, intermediates, or derivatives from reaction mixture viii) For the recovery and/or purification of metals or their salts or other derivatives, from their mixtures with other metals, their salts or derivatives, and/or other compounds ix) For the recovery and/or purification products from sea water, waste water, or for desalination of sea water and for waste water treatment.

x) For the recovery and/or purification of products which are ionic, non-ionic or zwitterionic as mentioned above or other products obtained by synthetic, semisynthetic or biosynthetic way known to those skilled in art and has resemblance similar to that of products mentioned above Thus the present invention can be easily applied to an industrial level.

The following are the examples carried out to demonstrate the present invention. However the present invention should not be construed as limited to the description of the example.

EXAMPLE 1

Continuous Countercurrent Fluidized/Moving Bed/Expanded Moving Bed System Details and its Application for Purification of Lysozyme from Chicken Egg White Extract In the arrangement shown in FIGS. 1 to 4, the top hopper 1 is an acrylic cylinder of 30 cm diameter and 50 cm height. Outlet of the hopper for transporting the solids to the top of the first stage/column 8 is 1.5 cm diameter acrylic pipe, wherein the solid flow is controlled through valve 3. The main column consists of three stages/columns 8, 20 and 32 made of glass columns with each stage/column having 10.5 cm inner diameter and 72 cm height. Inlets and outlets for the liquid are provided at the bottom and at the top of each stage/column via a glass pipe having 1.0 cm inner diameter. Distributor to each stage/column is a 0.3 cm thick stainless steel plate, over which is placed a 50 micron wire mesh. The distributors are incorporated between each two consecutive stages/columns As in FIGS. 1 to 4. The bottom distributor has central solid downcomer line of 0.625 cm diameter and of height sufficient to deep inside the next stage/column at a level below the top liquid outlet. A quarter inch valve (for example 17, 29, 41 as shown in FIGS. 1 and 3) is provided in the central solid downcomer line to control the solid flow. A conical distributor as shown in FIGS. 1 and 3, used for feeding primary liquid, is of outer diameter 8.0 cm, giving concentric opening of 2.5 cm between said distributor and the glass column. This distributor is fixed at 10 cm height above bottom of particular stage/column. The distance between said two distributors is secondary fluidized/expanded section wherein washing of solid occurs in countercurrent mode by up flowing liquid. The last stage/column 32 has bottom outlet 39 to remove the solids continuously, which are then transported to top of the first stage/column 8 through an acrylic hopper 1, by glass liquid-solid ejector 45 or pump (diaphragm pump system) system 51.

Further, the experiment carried out using this fluidized moving bed and/or expanded moving bed apparatus as described above, with chicken egg white extract for the recovery and purification of lysozyme (Table 1). The specific activity of lysozyme and protein content in the feedstock prepared after dilution to 40% (v/v) with sodium acetate buffer (pH 4.5) were assayed at about 3556 U/mg and 56.6 mg/ml respectively. This solution was fed continuously to the first stage/column for adsorption on adsorbent particles (SEPABEADS EB-CM, from Resindion SRL, Italy) and exhausted liquid was discharged through top liquid outlet. The solid adsorbents to which lysozyme is adsorbed was washed in the same stage in washing zone with sodium acetate buffer as auxiliary liquid followed by elution in second stage/column. Further, the regeneration of the adsorbent media was carried out in third stage/column with 0.5M sodium hydroxide solution. Finally regenerated adsorbent particles were equilibrated in hopper with sodium acetate buffer and re-circulated to the top of first stage/column. All steps of adsorption, washing, elution, regeneration and equilibration are carried continuously. During the operation, solids are contacted with feed, washing, elution and regeneration liquid in countercurrent mode. This has enhanced the efficiency of the process terms of productivity.

TABLE 1 summary of the parameters and results of the lysozyme recovery and purification using FMB/EMB

| Parameter | Result |
|---|---|
| Feed protein concentration, mg/ml | 56.6 |
| Feed lysozyme activity, U/ml | $2.00 \times 10^5$ |
| Total lysozyme activity loaded, Units | $4.83 \times 10^9$ |
| specific activity of feed, Units/mg | 3556 |
| Total protein loaded, mg | $1.36 \times 10^6$ |
| Flow velocity, cm/hr | 277 |
| Total eluted protein, mg | 26579 |
| Total lysozyme activity recovered, Units | $4.68 \times 10^9$ |
| Yield, % | 97 |
| Specific activity, Units/mg | $1.76 \times 10^5$ |
| Purification factor | 49.58 |
| Production rate, KUnits/hr/Liter of adsorbent) | $7.81 \times 10^5$ |
| Lysozyme purity, % | 98.68 |

EXAMPLE 2

Continuous Recovery of Copper from Industrial Waste Mother Liquor (ML)

Continuous countercurrent fluidized moving bed/expanded moving bed system was constructed with four stages/columns. The length of four stages/columns was 130 cm, 230 cm, 130 cm and 130 cm for washing, adsorption, elution and regeneration section, whereas diameter was 10 cm for all stages/columns. Primary and secondary liquid inlets, distributors for the same and outlets were provided to each stage/column as described earlier. Peristaltic pump system was used for re-circulation of solid adsorbents from last stage to the top of the first stage/column through solid adsorbent collection tank and solid adsorbent feed hopper. All four stages/column were operated in continuous countercurrent mode. Water, 10% v/v HCl and 12% v/v ammonia used for washing, elution and regeneration/equilibration of the solid adsorbents.

Once the steady state was achieved, mother liquor containing 2.37 mg/ml of copper was continuously loaded on the adsorbent at 700 ml/min flow rate in countercurrent mode in second stage/column of the system and exhausted mother liquor was collected from liquid outlet from the same stage/ column. Loaded solid adsorbent was transported to second stage/column through solid downcomer tube located centrally, wherein elution/desorption of copper was performed by 10% v/v HCl solution flowing counter currently to the falling adsorbents. Copper solution as copper chloride was collected from liquid outlet from same stage or column. Further, solid adsorbents were carried to fourth stage/column where regeneration was carried out using 12% v/v ammonia solution and such regenerated adsorbents were collected in solid adsorbent collection tank, transported to solid adsorbent feed hopper by peristaltic pump and then to the first stage/column where washing was performed using water before solid adsorbents were transported to adsorption stage/column (i.e. second stage column). The results of the process are summarized in following Table 2. Copper was recovered at a rate of more than 97% without any significant loss in exhaust mother liquor, regeneration and washing stage/column.

TABLE 2

Results obtained for recovery of copper from industrial waste mother liquor

| Time (min) | Stage 2 inlet (Feed) (Cu mg/ml) | Stage 2 outlet (adsorption), Cu, mg/ml | Stage 3 Outlet (Elution) Cu, mg/ml | Stage 4 outlet (regeneration), Cu, mg/ml | Stage 1 outlet (washing) Cu, mg/ml |
|---|---|---|---|---|---|
| 30  | 2.37 | ND   | 2.21 | ND    | ND |
| 60  | 2.37 | ND   | 2.25 | ND    | ND |
| 90  | 2.37 | 0.01 | 2.45 | 0.001 | ND |
| 120 | 2.37 | 0.01 | 2.18 | ND    | ND |
| 125 | 2.37 | ND   | 2.16 | ND    | ND |
| 180 | 2.37 | ND   | 2.35 | ND    | ND |
| 210 | 2.37 | 0.02 | 2.35 | ND    | ND |
| 240 | 2.37 | ND   | 2.30 | 0.001 | ND |
| 285 | 2.37 | 0.01 | 2.32 | ND    | ND |
| 300 | 2.37 | ND   | 2.31 | ND    | ND |
| 330 | 2.37 | ND   | 2.42 | ND    | ND |

EXAMPLE 3

Recovery and Purification of Potato Proteins from Potato Fruit Juice

Continuous countercurrent fluidized moving bed/expanded moving bed system described in example 2 was for the experiment. Table 3 summarizes the experimental results of recovery and purification of potato proteins (protease inhibitor and Patatin) from potato fruit juice. Ion exchange adsorbent was used for the purification of these two proteins. Adsorption of proteins from crude juice was performed in first stage/column followed by its washing in same stage/column using citrate buffer of pH 5.2. Protease inhibitor was recovered in flow through arising from adsorption stage (first stage). Elution of bound patatin was carried out in second stage using elevated ionic strength. In the third stage/column regeneration was performed using 0.5M NaOH and fourth stage/column was used for equilibration of solid adsorbents using citrate buffer of pH 5.2. Patatin and protease inhibitor was completely separated and recovered in more than 95% SDS-PAGE purity.

TABLE 3

Results obtained for recovery and purification of potato proteins from potato fruit juice

| Time (min) | (Stage 1) Protease inhibitor, mg/ml in feed | (Stage 1) Patatin, mg/ml in feed | Stage 1 outlet Protease inhibitor, mg/ml | Stage 2 outlet Patatin, mg/ml | Stage 3 Regeneration Protein, mg/ml |
|---|---|---|---|---|---|
| 20  | 4.6 | 2.5 | 4.40 | 2.20 | 0.40 |
| 40  | 4.6 | 2.5 | 4.55 | 2.30 | 0.50 |
| 60  | 4.6 | 2.5 | 4.50 | 2.47 | 0.40 |
| 80  | 4.6 | 2.5 | 4.60 | 2.42 | 0.35 |
| 120 | 4.6 | 2.5 | 4.61 | 2.40 | 0.32 |
| 140 | 4.6 | 2.5 | 4.58 | 2.44 | 0.40 |
| 160 | 4.6 | 2.5 | 4.65 | 2.45 | 0.43 |
| 180 | 4.6 | 2.5 | 4.56 | 2.48 | 0.45 |
| 200 | 4.6 | 2.5 | 4.62 | 2.52 | 0.25 |
| 220 | 4.6 | 2.5 | 4.60 | 2.55 | 0.38 |
| 240 | 4.6 | 2.5 | 4.40 | 2.80 | 0.40 |
| 250 | 4.6 | 2.5 | 4.56 | 2.50 | 0.42 |
| 300 | 4.6 | 2.5 | 4.58 | 2.47 | 0.50 |

What is claimed is:

1. A composite continuous countercurrent fluidized moving bed and/or expanded moving bed system comprising: two or more (n>2) fluidized/expanded moving bed stages/columns (8); operated in continuous countercurrent fluidized/expanded bed mode and stacked one above the other; wherein each stage/column (8) involves solid adsorbent particulate bed flowing downwards countercurrent to a primary liquid and a secondary/auxiliary liquid flowing upwards, with the fluid superficial velocity in each stage/column (8) exceeding the minimum fluidization velocity of the particle fluid system;

one or more means to feed (1, 2) the solid adsorbents to the top of a first stage/column (8) from a solid feed hopper (1) above it, and to feed the solid particulate from the bottom of said first stage/column to the top of a second stage/column (8) located below said first stage/column (8), and so on until the solid particulate is fed to the top of the $n^{th}$ stage/column (8) from bottom of the $(n-1)^{th}$ stage/column (8) located above the $n^{th}$ stage/column (8);

means to collect said solid adsorbent from the $n^{th}$ stage/column to a solid adsorbent collection tank;

means to uniformly distribute (13, 55) the countercurrent flowing solid adsorbents on the top and over the cross section of the respective stage/column (8) the solid adsorbents are fed to;

means to transport (40, 45, 49, 51) said solid adsorbent from the $n^{th}$ stage/column (8) to a solid adsorbent collection tank (42);

means to control (17, 18, 30) the flow of said solid adsorbents from a stage/column (8) to the next stage/column;

the means to feed (52) the primary liquid adjacent to the bottom end of each stage/column (8) and a means to feed secondary/auxiliary liquids at the bottom of each stage/column (8);

means to uniformly distribute primary and secondary/auxiliary liquids while entering each stage/column (8);

means to feed (54) the secondary/auxiliary liquid at the bottom of each stage/column (8), through a secondary perforated flow distributor (13, 55) to create an auxiliary fluidized/expanded section for effective washing of said adsorbents, wherein washing of said solid adsorbents occurs in continuous countercurrent manner with up flowing secondary liquid, and prevents inter-mixing of primary liquid between two adjacent stages/columns (8); wherein the means to feed (54) the secondary/auxiliary liquid feed through a secondary perforated flow distributed (13, 55) to create auxiliary fluidized/expanded section, wherein washing of said solid adsorbents occurs in continuous countercurrent manner with up flowing secondary liquid, and prevents mixing of primary liquids between two adjacent stages/columns (8);

the means for outflow of both primary and secondary liquids together at the top end of the respective stage/column (8); wherein the means to transport back (40, 45, 49, 51) the re-circulate said solid adsorbents from collection tank (42) to the top of said first stage/column (8) through said solid adsorbent feed hopper (1).

2. The system of claim 1, wherein the fluidized/expanded moving bed stages/columns (8) are vertically stacked one over the other.

3. The system of claim 1, wherein the means to feed the solid adsorbents (1, 2) comprise solid downcomer tubes (15, 16) that feed said solid adsorbents uniformly at the top of the said first stage/column (8) from the said solid adsorbent feed hopper (1), and uniformly distribute the solids at the top of the said second stage/column (8) from said first stage/column (8) located above the said second stage/column (8), and so on similarly, uniformly to the top of the said $n^{th}$ stage/column (8) from $(n-1)^{th}$ stage/column located above the said $n^{th}$ stage/column (8).

4. The system of claim 3, wherein the solid downcomer tubes (15, 16) of a particular stage/column (8) originates from a secondary distributor plate (13, 55) of the particular stage/column (8) and has an opening at the top of the next fluidized/expanded bed, are of sufficient length so as to dip into the liquid level in the lower stage/column (8) but remains above the expanded/fluidized bed of solid adsorbents.

5. The system of claim 3, wherein the flow of solid adsorbent through said solid downcomer tubes (15, 16) is controlled using valves (17, 18) to afford control over the downward adsorbent slurry flow.

6. The system of claim 1, wherein the solid adsorbents are re-circulated back to the solid adsorbent feed hopper (1), which feeds to the top of the said first stage/column, using a pump or any means for transport of liquid-solid slurry.

7. A method of using the composite continuous countercurrent fluidized moving bed and/or expanded moving bed system as claimed in claim 1, wherein at least one stage/column (8) is selected to operate as an adsorber, operating in continuous countercurrent fluidized bed/expanded bed mode wherein the some or all the component/s in the feed coming in through the primary central distributor adsorb on the said adsorbent particle phase;

the countercurrent flowing solid adsorbents with adsorbed component/s from the adsorber stage/column (8) for washing, desorption, regeneration, and equilibration stages is in sequential manner involving appropriate washing desorption, regeneration and equilibration stages in sequential manner involving appropriate washing, desorption, regeneration and equilibration liquid compositions; wherein the sequence of the stages/columns (8) from adsorption to regeneration is maintained regardless of whichever stage/column (8) is operated as adsorber with the top most first stage/column (8) following in sequence from the last bottommost $n^{th}$ stage/column (8).

8. The method of claim 7, further comprising at least a recovery, isolation, separation, purification or polishing step.

9. The method of claim 7, wherein the fluidized/expanded moving bed stages/columns (8) are vertically stacked one over the other.

10. The method of claim 7, wherein the means to feed the solid adsorbents (1, 2) comprise solid downcomer tubes (15, 16) that feed said solid adsorbents uniformly at the top of the said first stage/column (8) from the said solid adsorbent feed hopper (1), and uniformly distribute the solids at the top of the said second stage/column (8) from said first stage/column (8) located above the said second stage/column (8), and so on similarly, uniformly to the top of the said $n^{th}$ stage/column (8) from $(n-1)^{th}$ stage/column located above the said $n^{th}$ stage/column (8).

11. The method of claim 10, wherein the solid downcomer tubes (15, 16) of a particular stage/column (8) originates from a secondary distributor plate (13, 55) of the particular stage/column (8) and has an opening at the top of the next fluidized/expanded bed, are of sufficient length so as to dip in to the liquid level in the lower stage/column (8) but remains above the expanded/fluidized bed of solid adsorbents.

12. The method of claim 10, wherein the flow of solid adsorbent through said solid downcomer tubes (15, 16) is controlled using valves (17, 18) to afford control over the downward adsorbent slurry flow.

13. The method of claim 7, wherein the solid adsorbents are re-circulated back to the solid adsorbent feed hopper (1), which feeds to the top of the said first stage/column, using a pump or any means for transport of liquid-solid slurry.

\* \* \* \* \*

UNITED STATES PATENT AND TRADEMARK OFFICE
CERTIFICATE OF CORRECTION

PATENT NO.       : 8,673,225 B2
APPLICATION NO.  : 13/255890
DATED            : March 18, 2014
INVENTOR(S)      : Lali et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 57 days.

Signed and Sealed this

Twenty-ninth Day of September, 2015

Michelle K. Lee
*Director of the United States Patent and Trademark Office*